(12) United States Patent
  Kazmi et al.

(10) Patent No.: US 10,938,609 B2
(45) Date of Patent: Mar. 2, 2021

(54) NUMEROLOGY COMBINATION SETS FOR MULTI-CARRIER OPERATION

(71) Applicant: TELEFONAKTIEBOLAGET LM ERICSSON (PUBL), Stockholm (SE)

(72) Inventors: Muhammad Kazmi, Sundbyberg (SE); Imadur Rahman, Sollentuna (SE); Christian Bergljung, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 41 days.

(21) Appl. No.: 16/475,468

(22) PCT Filed: Jan. 4, 2018

(86) PCT No.: PCT/IB2018/050067
§ 371 (c)(1),
(2) Date: Jul. 2, 2019

(87) PCT Pub. No.: WO2018/127833
PCT Pub. Date: Jul. 12, 2018

(65) Prior Publication Data
US 2019/0342132 A1 Nov. 7, 2019

Related U.S. Application Data

(60) Provisional application No. 62/443,366, filed on Jan. 6, 2017.

(51) Int. Cl.
*H04L 27/26* (2006.01)

(52) U.S. Cl.
CPC .................. *H04L 27/2604* (2013.01)

(58) Field of Classification Search
None
See application file for complete search history.

(56) References Cited

U.S. PATENT DOCUMENTS

| 10,674,536 B2* | 6/2020 | Sun ...................... H04L 27/2666 |
| 2007/0254693 A1 | 11/2007 | Furukawa |
| 2011/0268001 A1 | 11/2011 | Lee et al. |
| 2019/0089498 A1* | 3/2019 | Pelletier .............. H04W 72/005 |
| 2019/0320337 A1* | 10/2019 | Siomina .............. H04L 27/2607 |

FOREIGN PATENT DOCUMENTS

| JP | 2013530602 A | 7/2013 |
| WO | 2006072980 A1 | 7/2006 |
| WO | 2016155530 A1 | 10/2016 |

(Continued)

OTHER PUBLICATIONS

3GPP TS 36.331 V14.0.0 (Sep. 2016), 3rd Generation Partnership Project; Technical Specification Group Radio Access Network; Evolved Universal Terrestrial Radio Access (E-UTRA); Radio Resource Control (RRC); Protocol specification, (Release 14), 644 pages.

(Continued)

*Primary Examiner* — Phuongchau Ba Nguyen

(57) ABSTRACT

Systems and methods for determining a set of numerologies—for performing multicarrier operation of a user equipment for operating signals on at least a first carrier in a first cell and a second carrier in a second cell are provided.

20 Claims, 10 Drawing Sheets

400. Determine a set of numerologies, including a first numerology and a second numerology, for performing multicarrier operation 410. Determine a relation between the first carrier and the second carrier 420. Use the first numerology for operating signals on the first carrier and the second numerology for operating signals on the second carrier

(56) References Cited

FOREIGN PATENT DOCUMENTS

WO    2016192644 A1    12/2016
WO    2017067522 A1     4/2017

OTHER PUBLICATIONS

3GPP TS 36.306 V14.0.0 (Sep. 2016), 3rd Generation Partnership Project; Technical Specification Group Radio Access Network; Evolved Universal Terrestrial Radio Access (E-UTRA); User Equipment (UE) radio access capabilities (Release 14), 63 pages.
3GPP TS 36.101 V14.0.0 (Jun. 2016), 3rd Generation Partnership Project; Technical Specification Group Radio Access Network; Evolved Universal Terrestrial Radio Access (E-UTRA); User Equipment (UE) radio transmission and reception (Release 14), 1057 pages.
Frank Schaich et al., Subcarrier spacing—how to make use of this degree of freedom, 2016 IEEE, 6 pages.
Motorola, TP; LTE-Advanced; UE Rx characteristics, R4-091804, 3GPP TSG-RAN Meeting #50, San Francisco, USA, May 4-8, 2009, 3 pages.
Ericsson, On carrier aggregation, R1-1612906, TSG-RAN WG1 #87 Reno, NV, USA, Nov. 14-18, 2016, 1 page.
ISR and Written Opinion from corresponding application PCT/IB2018/050067.

* cited by examiner

| Numerology attribute | Long CP/ low frequency / MBMS | Normal CP/ low frequency | Optimized CP / low frequency / reduced latency | Small CP / high frequency / reduced latency |
|---|---|---|---|---|
| Subcarrier spacing | 3.75 kHz (0.25x15 kHz) | 15 kHz | 30 kHz (2x15 kHz) | 60 kHz (4x15 kHz) |
| Slot duration | 2000 μs | 500 μs | 250 μs | 125 μs |
| OFDM symbol, duration | 266.67 μs | 66.67 μs | 33.33 μs | 16.67 μs |
| Cyclic prefix, duration | 19.05 μs | 4.76 μs | 2.38 μs | 1.19 μs |
| OFDM symbol including cyclic prefix | 285.71 μs | 71.43 μs | 35.71 μs | 17.86 μs |

NUMEROLOGY COMBINATION SETS FOR MULTI-CARRIER OPERATION

CROSS REFERENCE TO RELATED APPLICATIONS

This application claims the benefit of U.S. Provisional Application No. 62/443,366 filed on Jan. 6, 2017, the entire contents of which are hereby incorporated by reference.

TECHNICAL FIELD

The present disclosure generally relates to wireless communications and wireless communication networks.

Introduction

The architecture for New Radio (NR) (also known as 5G or Next Generation) is being discussed in standardization bodies such as 3GPP and an example network architecture is illustrated in FIG. 1. eNB 10A-10B denotes a Long Term Evolution (LTE) eNodeB, and gNB 12A-12B denotes an NR base station (BS). One NR BS can correspond to one or more transmission/reception points. The links between the nodes illustrate the possible corresponding interfaces which may be deployed. For example, the interface between the Evolved Packet Core (EPC) node 14 and eNB 10A can be an LTE S1 interface while the interface between EPC node 14 and gNB 12A can be S1-like. The interface between an eNB 10A and gNB 12A can be similar to an X2 interface. The interface between an NR core node 16 and gNB 12B can be an NG1 interface.

FIG. 2 further illustrates a variety of example deployment scenarios for the NR BS 30A-30F and LTE eNB 40A-40C connecting to the core network 20. Those skilled in the art will appreciate that numerous deployment approaches can be considered.

FIG. 2a illustrates an example non-centralized deployment. FIG. 2b illustrates an example co-sited deployment. FIG. 2c illustrates an example centralized deployment, where the upper layers of the NR BS 32 are centralized and the lower layers of the NR BS 34A-34C are distributed. FIG. 2d illustrates an example shared deployment, where three core operators 20A, 20B, 20C connect to the NR BS 30E-30F.

In NR, which is based on Orthogonal Frequency Division Multiplexing (OFDM), multiple numerologies can be supported for operation, e.g. transmission and/or reception of signals. The term "numerology" may characterize any one or more of: frame duration, subframe or Transmission Time Interval (TTI) duration, slot duration, min-slot duration, symbol durations subcarrier spacing, number of subcarriers per physical channel (e.g. RB), number of RBs within the bandwidth, etc.

A scaling approach (based on a scaling factor 2N, N=1, 2, . . . ) is considered for deriving subcarrier spacings for NR: 15 kHz, 30 kHz, 60 kHz, 120 KHz, etc. The numerology-specific time resource durations (e.g. slot, subframe, etc.) can then be determined in milliseconds (ms) based on the subcarrier spacing. For example, a subcarrier spacing of (2N×15) kHz gives exactly ½N ms.

FIG. 3 illustrates examples of numerology attributes 50 for NR in terms of carrier spacings, slot duration, symbol duration, cyclic prefix (CP) length, etc.

In multicarrier or carrier aggregation (CA) operation, a user equipment (UE) is able to receive and/or transmit data to more than one serving cell(s). The term "carrier aggregation" can also be interchangeably referred to as "multi-carrier system", "multi-cell operation", "multi-carrier operation", "multi-carrier" transmission and/or reception. In CA one of the component carriers (CCs) is the primary component carrier (PCC), or simply primary carrier or anchor carrier. The remaining carriers are called secondary component carrier (SCC), or simply secondary carriers or supplementary carriers. The serving cell can be interchangeably called the primary cell (PCell) or primary serving cell (PSC). Similarly, the secondary serving cell can be interchangeably called the secondary cell (SCell) or secondary serving cell (SSC).

In Dual Connectivity (DC) operation, the UE can be served by at least two nodes called the master eNB (MeNB) and the secondary eNB (SeNB). More specifically, in DC the UE is configured with a Master Cell Group (MCG) and a Secondary Cell Group (SCG). Cell Group (CG) is a group of serving cells associated with either the MeNB or the SeNB, respectively. The MCG is a group of serving cells associated with the MeNB, comprised of the PCell and optionally one or more SCells. The SCG is a group of serving cells associated with the SeNB comprised of the PSCell (Primary SCell) and optionally one or more SCells.

More generally, in multiple connectivity (aka multi-connectivity) (MC) operation, the UE can be served by two or more nodes, e.g. MeNB, SeNB1, SeNB2, and so on. The UE is configured with PCC from both MeNB and SeNB. The PCell from MeNB and SeNB are called as PCell and PSCell respectively. The PCell and PSCell operate the UE typically independently. The UE is also configured with one or more SCCs from each of MeNB and SeNB. The corresponding secondary serving cells served by MeNB and SeNB are called SCell. The UE in DC typically has separate TX/RX for each of the connections with MeNB and SeNB. This allows the MeNB and SeNB to independently configure the UE with one or more procedures, such as radio link monitoring (RLM), DRX cycles, etc., on their PCell and PSCell respectively.

In DC or MC, a UE capable of both LTE and NR operations can also be configured with at least one CG containing one or more LTE serving cells (e.g. PCell) and with at least one CG containing one or more NR serving cells (e.g. PSCell).

A multicarrier system (CA, DC or MC) may involve carriers in licensed and/or unlicensed spectrum or frequency bands.

In NR, different numerologies (for example, subcarrier spacings) can be used for the operating signals between a UE and a network node or between any pair of UEs which are capable of device-to-device (D2D) operation. The support of these multiple numerologies can lead to complexity, processing and cost of the devices. The complexity may be further increased for devices supporting multicarrier operation as discussed above.

SUMMARY

It is an object of the present disclosure to obviate or mitigate at least one disadvantage of the prior art.

There are provided systems and methods for determining a set of numerologies for performing multicarrier operation in at least a first cell of a first carrier and a second cell of a second carrier.

In a first aspect of the present disclosure, there is provided a method performed by a wireless device. The method includes determining a set of numerologies supported by the wireless device for performing multicarrier operation. The set of numerologies includes at least a first numerology for operating signals on a first carrier in a first cell and a second numerology for operating signals on a second carrier in a second cell. Responsive to determining a relation between the first carrier and the second carrier, the wireless device uses the first numerology for operating the signals on the first carrier in the first cell and the second numerology for operating the signals on the second carrier in the second cell.

In another aspect of the present disclosure, there is provided a wireless device comprising circuitry including a processor and a memory, the memory containing instructions executable by the processor whereby the wireless device is operative to determine a set of numerologies supported by the wireless device for performing multicarrier operation. The set of numerologies includes at least a first numerology for operating signals on a first carrier in a first cell and a second numerology for operating signals on a second carrier in a second cell. Responsive to determining a relation between the first carrier and the second carrier, the wireless device uses the first numerology for operating the signals on the first carrier in the first cell and the second numerology for operating the signals on the second carrier in the second cell.

In some embodiments, the numerologies comprise one or more attributes defining signal characteristics. The attribute(s) can include at least one of a subcarrier spacing, a symbol duration, a cycle prefix length, a time slot duration, a frame duration, a subframe duration, a transmission time interval duration, a number of subcarriers per physical channel, and a number of physical channels within the bandwidth.

In some embodiments, in accordance with determining that the first and second carriers belong to different frequency bands, the first numerology and the second numerology are different numerologies (e.g. different numerologies are used for operating signals on the first carrier in the first cell and for operating the signals on the second carrier in the second cell).

In some embodiments, in accordance with determining that the first and second carriers belong to different frequency bands and that a difference between frequencies of the first and second carriers is greater than a threshold, the first numerology and the second numerology are different numerologies.

In some embodiments, in accordance with determining that the first and second carriers belong to different frequency bands and that a difference between frequencies of the first and second carriers is less than or equal to a threshold, the first numerology and the second numerology are the same numerology (e.g. the same numerology is used for operating signals on the first carrier in the first cell and for operating the signals on the second carrier in the second cell).

In some embodiments, in accordance with determining that the first and second carriers belong to a same frequency band, the first numerology and the second numerology are the same numerology.

In some embodiments, in accordance with determining that frequencies of the first and second carriers are non-adjacent and that a gap between frequencies of the first and second carriers is less than or equal to a given threshold, the first numerology and the second numerology are the same numerology.

In some embodiments, in accordance with determining that the first and second carriers belong to a same frequency band and that a gap between frequencies of the first and second carriers is greater than a given threshold, the first numerology and the second numerology are different numerologies.

In some embodiments, different numerologies can be used for operating signals on a downlink channel and an uplink channel of the first carrier. In some embodiments, a common transmitter and/or a common receiver can be used when using the same numerology for the first numerology and the second numerology. In some embodiments, a different transmitter and/or a different receiver can be used when using different numerologies for the first numerology and the second numerology.

In some embodiments, the wireless device can receive a request to perform multicarrier operation from a network node. The wireless device can further transmit information associated with the set of numerologies supported by the wireless device for performing multicarrier operation to a network node.

The various aspects and embodiments described herein can be combined alternatively, optionally and/or in addition to one another.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures, wherein:

FIG. 3 illustrates example numerology configurations for NR;

DETAILED DESCRIPTION

Figure 1:
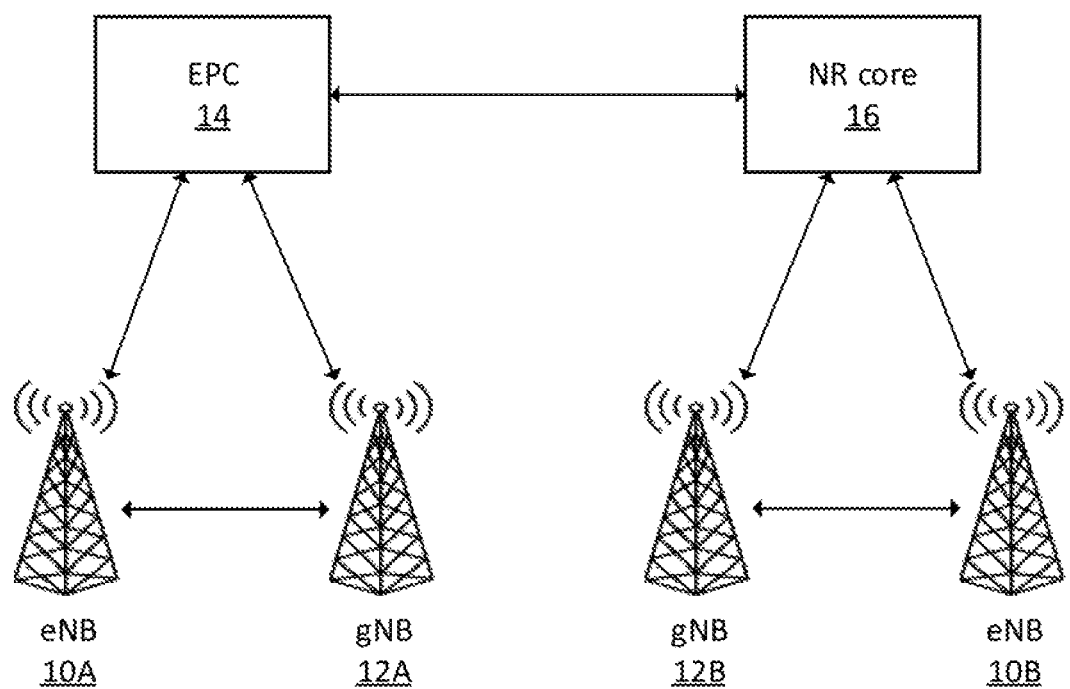
FIG. 1 illustrates an example NR architecture.
Figure 2:
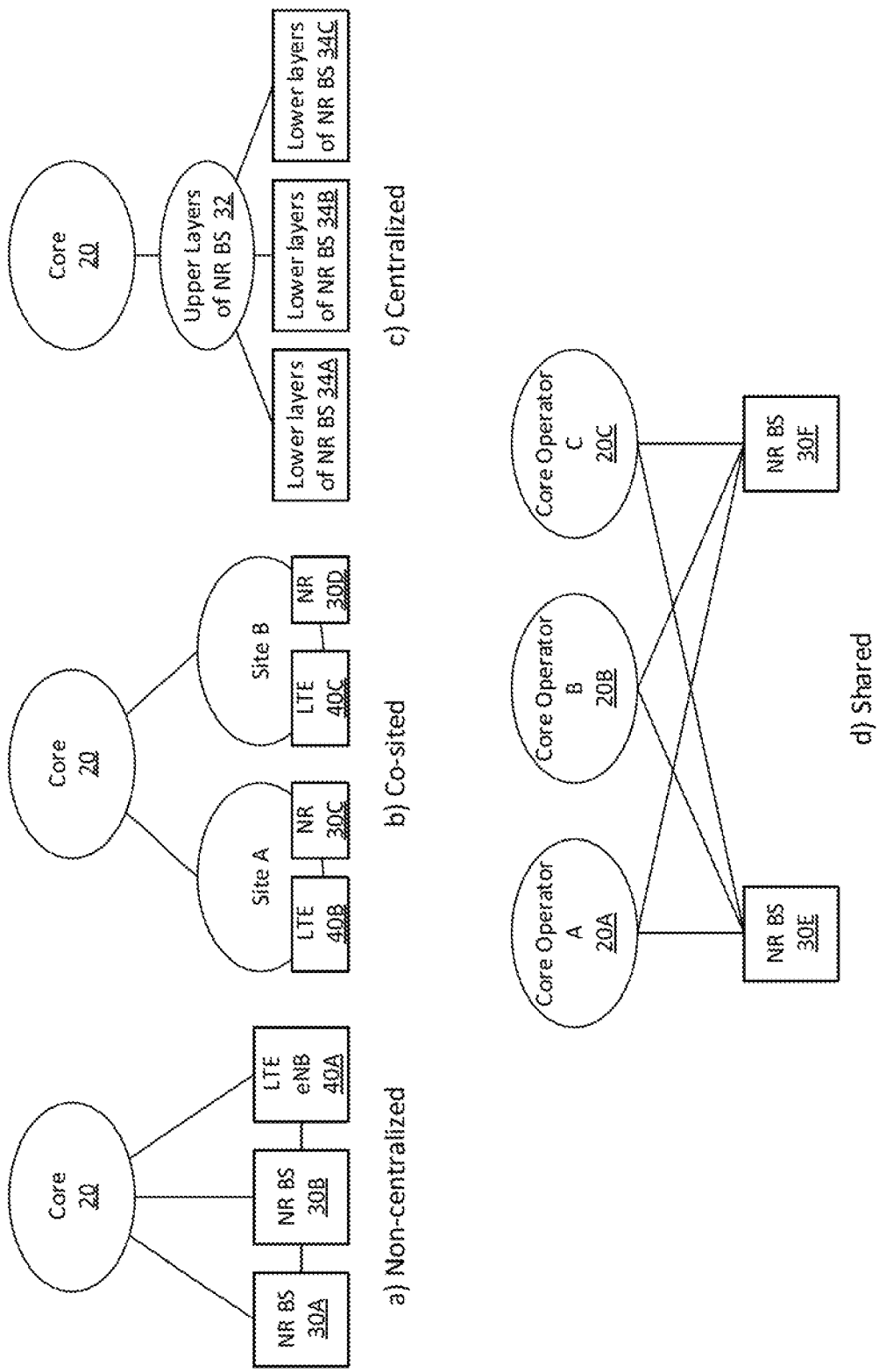
FIG. 2 illustrates NR deployment examples.

The embodiments set forth below represent information to enable those skilled in the art to practice the embodiments. Upon reading the following description in light of the accompanying drawing figures, those skilled in the art will understand the concepts of the description and will recognize applications of these concepts not particularly addressed herein. It should be understood that these concepts and applications fall within the scope of the description.

In the following description, numerous specific details are set forth. However, it is understood that embodiments may be practiced without these specific details. In other instances, well-known circuits, structures, and techniques have not been shown in detail in order not to obscure the understanding of the description. Those of ordinary skill in the art, with the included description, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In some embodiments, the non-limiting term "network node" is used and it can correspond to any type of radio access node (or radio network node) or any network node, which can communicate with a UE and/or with another network node in a cellular or mobile or wireless communication system. Examples of network nodes are NodeB, MeNB, SeNB, a network node belonging to MCG or SCG, base station (BS), multi-standard radio (MSR) radio access node such as MSR BS, eNodeB, network controller, radio network controller (RNC), base station controller (BSC), relay, donor node controlling relay, base transceiver station (BTS), access point (AP), transmission points, transmission nodes, RRU, RRH, nodes in distributed antenna system (DAS), core network node (e.g. MSC, MME, etc.), O&M, OSS, Self-organizing Network (SON), positioning node (e.g. E-SMLC), MDT, test equipment, etc. Example embodiments of a network node are described in more detail below with respect to FIG. 9.

In some embodiments, the non-limiting term "user equipment" (UE) is used and it can refer to any type of wireless device which can communicate with a network node and/or with another UE in a cellular or mobile or wireless communication system. Examples of UE are target device, device to device (D2D) UE, machine type UE or UE capable of machine to machine (M2M) communication, personal digital assistant, tablet, mobile terminal, smart phone, laptop embedded equipped (LEE), laptop mounted equipment (LME), USB dongles, ProSe UE, V2V UE, V2X UE, MTC UE, eMTC UE, FeMTC UE, UE Cat 0, UE Cat M1, narrow band IoT (NB-IoT) UE, UE Cat NB1, etc. Example embodiments of a UE are described in more detail below with respect to FIG. 8.

In some embodiments, the term "radio access technology" (RAT) refers to any RAT e.g. UTRA, E-UTRA, narrow band internet of things (NB-IoT), WiFi, Bluetooth, next generation RAT (NR), 4G, 5G, etc. Any of the first and the second nodes may be capable of supporting a single or multiple RATs.

The term "radio node" used herein can be used to denote a UE or a network node.

In some embodiments, a UE can be configured to operate in carrier aggregation (CA) implying aggregation of two or more carriers in at least one of DL and UL directions. With CA, a UE can have multiple serving cells, wherein the term 'serving' herein means that the UE is configured with the corresponding serving cell and may receive from and/or transmit data to the network node on the serving cell e.g. on PCell or any of the SCells. The data is transmitted or received via physical channels e.g. PDSCH in DL, PUSCH in UL etc. A component carrier (CC) also interchangeably called as carrier or aggregated carrier, PCC or SCC is configured at the UE by the network node using higher layer signaling e.g. by sending RRC configuration message to the UE. The configured CC is used by the network node for serving the UE on the serving cell (e.g. on PCell, PSCell, SCell, etc.) of the configured CC. The configured CC is also used by the UE for performing one or more radio measurements (e.g. RSRP, RSRQ, etc.) on the cells operating on the CC, e.g. PCell, SCell or PSCell and neighboring cells.

In some embodiments, a UE can also operate in dual connectivity (DC) or multi-connectivity (MC). The multi-carrier or multicarrier operation can be any of CA, DC, MC, etc. The term "multicarrier" can also be interchangeably called a band combination.

The term "radio measurement" used herein may refer to any measurement performed on radio signals. Radio measurements can be absolute or relative. Radio measurements can be e.g. intra-frequency, inter-frequency, CA, etc. Radio measurements can be unidirectional (e.g., DL or UL or in either direction on a sidelink) or bidirectional (e.g., RTT, Rx-Tx, etc.). Some examples of radio measurements: timing measurements (e.g., propagation delay, TOA, timing advance, RTT, RSTD, Rx-Tx, etc.), angle measurements (e.g., angle of arrival), power-based or channel quality measurements (e.g., path loss, received signal power, RSRP, received signal quality, RSRQ, SINR, SNR, interference power, total interference plus noise, RSSI, noise power, CSI, CQI, PMI, etc.), cell detection or cell identification, RLM, SI reading, etc. The measurement may be performed on one or more links in each direction, e.g., RSTD or relative RSRP or based on signals from different TPs of the same (shared) cell.

The term "signaling" used herein may comprise any of: high-layer signaling (e.g., via RRC or a like), lower-layer signaling (e.g., via a physical control channel or a broadcast channel), or a combination thereof. The signaling may be implicit or explicit. The signaling may further be unicast, multicast or broadcast. The signaling may also be directly to another node or via a third node.

The term "time resource" used herein may correspond to any type of physical resource or radio resource expressed in terms of length of time. Examples of time resources include: symbol, time slot, sub-frame, radio frame, TTI, interleaving time, etc. The term "frequency resource" may refer to sub-band within a channel bandwidth, subcarrier, carrier frequency, frequency band. The term "time and frequency resources" may refer to any combination of time and frequency resources.

The term "numerology" used herein may refer to any one or more attributes defining signal characteristics. Examples of such attributes are: subcarrier spacing, symbol duration, CP duration (aka CP length), time slot duration, subframe duration, number of subcarriers per physical channel, number of physical channels within the bandwidth, etc. A physical channel used herein refers to any time-frequency radio resource. Examples of physical channels are resource block (RB), physical RB (PRB), virtual RB (VRB), etc.

The term "set of numerologies" used herein may refer to any combination of at least two numerologies which can be used for multicarrier operation of a UE involving at least two carrier frequencies. The term "set of numerologies" can be interchangeably referred to as numerology set, numerology combination set (NCS), multicarrier numerology combination set, etc.

The term "set of subcarriers" used herein may refer to any combination of at least two subcarriers which can be used for multicarrier operation of a UE involving at least two carrier frequencies. The term "set of subcarriers" can be interchangeably referred to as subcarrier set, subcarrier combination set (SCS), multicarrier subcarrier combination set, etc. SCS is one example of NCS.

Some examples of UE operation include: UE radio measurement (see the term "radio measurement" above), bidirectional measurement with UE transmitting, cell detection or identification, beam detection or identification, system information reading, channel receiving and decoding, any UE operation or activity involving at least receiving of one or more radio signals and/or channels, cell change or (re)selection, beam change or (re)selection, a mobility-related operation, a measurement-related operation, a radio resource management (RRM)-related operation, a positioning procedure, a timing related procedure, a timing adjustment related procedure, UE location tracking procedure, time tracking related procedure, synchronization related procedure, MDT-like procedure, measurement collection related procedure, a CA-related procedure, serving cell activation/deactivation, CC configuration/de-configuration, etc.

Embodiments of the present disclosure are directed towards multicarrier operation involving different numerologies. Some embodiments can enable a wireless device to support numerologies which are related to or associated with the wireless device radio architecture. Some embodiments can enable a network node to be aware of different set of numerologies supported by the wireless device for the multicarrier operation. This can allow the network node to appropriately configure the wireless device for multicarrier operation in NR or other networks.

Figure 4:
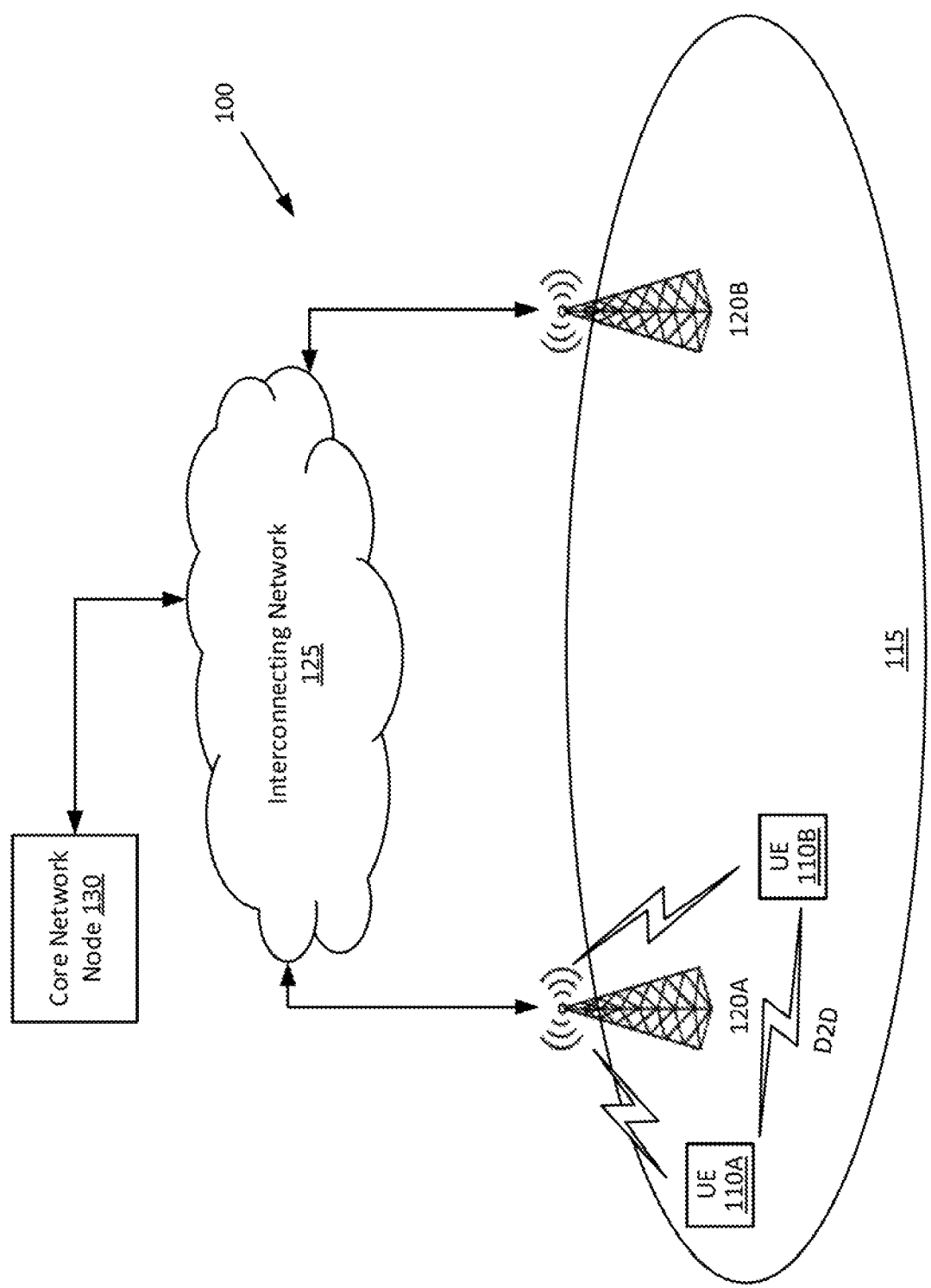
FIG. 4 illustrates an example wireless network.

FIG. 4 illustrates an example of a wireless network 100 that can be used for wireless communications. Wireless network 100 includes wireless devices, such as UEs 110A-110B, and network nodes, such as radio access nodes 120A-120B (e.g. eNBs, gNBs, etc.), connected to one or more core network nodes 130 via an interconnecting network 125. The network 100 can use any suitable deployment scenarios. UEs 110 within coverage area 115 can each be capable of communicating directly with radio access nodes 120 over a wireless interface. In some embodiments, UEs 110 can also be capable of communicating with each other via D2D communication.

As an example, UE 110A can communicate with radio access node 120A over a wireless interface. That is, UE 10A can transmit wireless signals to and/or receive wireless signals from radio access node 120A. The wireless signals can contain voice traffic, data traffic, control signals, and/or any other suitable information. In some embodiments, an area of wireless signal coverage 115 associated with a radio access node 120 can be referred to as a cell.

The interconnecting network 125 can refer to any interconnecting system capable of transmitting audio, video, signals, data, messages, etc., or any combination of the preceding. The interconnecting network 125 can include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the core network node 130 can manage the establishment of communication sessions and other various other functionalities for UEs 110. Examples of core network node 130 can include mobile switching center (MSC), MME, serving gateway (SGW), packet data network gateway (PGW), operation and maintenance (O&M), operations support system (OSS), SON, positioning node (e.g., Enhanced Serving Mobile Location Center, E-SMLC), MDT node, etc. UEs 110 can exchange certain signals with the core network node using the non-access stratum layer. In non-access stratum signaling, signals between UEs 110 and the core network node 130 can be transparently passed through the radio access network. In some embodiments, radio access nodes 120 can interface with one or more network nodes over an internode interface.

Figure 5:
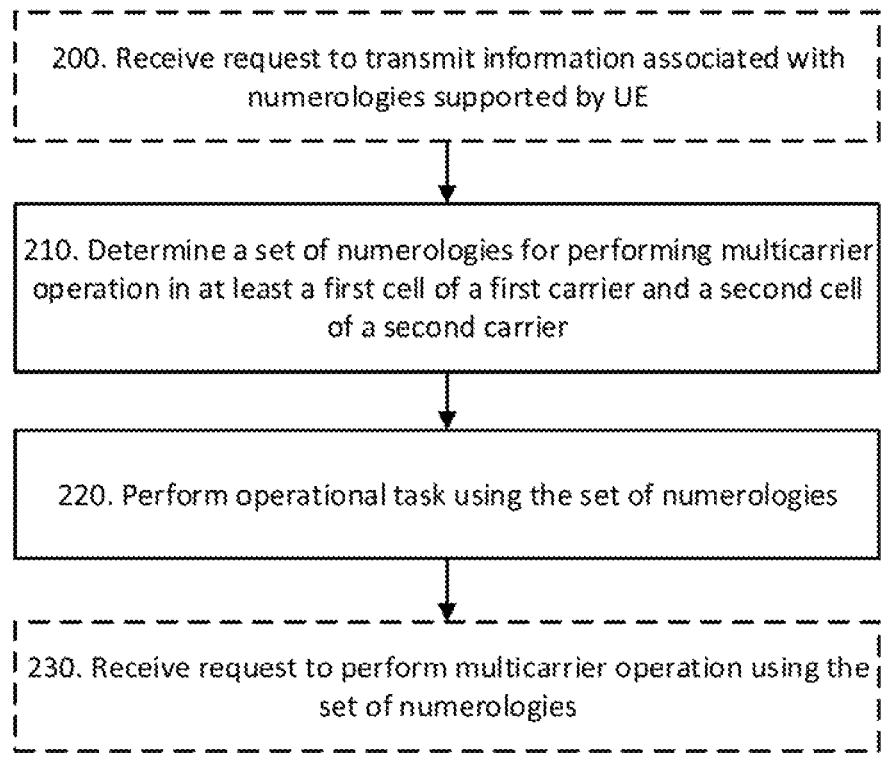
FIG. 5 is a flow chart illustrating a method which can be performed in a wireless device.

FIG. 5 is a flow chart illustrating a method which can be performed by a wireless device, such as UE 110. The method can include:

Step 200 (optional): Receiving a request from another node to transmit information about a set of numerologies supported by the UE for multicarrier operation.

Step 210: Determining at least a first set of numerologies (S1) including at least two numerologies: a first numerology (N1) and a second numerology (N2) used for operating signals in a first cell (cell1) of a first carrier (F1) and a second cell (cell2) of a second carrier (F2) respectively for performing multicarrier operation.

Step 220: Using the determined set of numerologies (S1) for one or more operational tasks (e.g. reporting results to another node, using S1 for multicarrier operation, adapting transceiver configuration, etc.).

Step 230 (optional): Receiving a request from a network node to perform multicarrier operation based on the determined set of numerologies (S1).

It will be appreciated that one or more of the above steps can be performed simultaneously and/or in a different order. Also, steps illustrated in dashed lines are optional and can be omitted in some embodiments. The steps will now be described in more detail.

Step 200

In some embodiments this step is optional for the UE. In step 200, the UE can receive a request from another node to transmit information about at least one set of numerologies supported by the UE for performing multicarrier operation involving at least two carrier frequencies. The UE may further receive a request for transmitting information about a plurality of sets of numerologies supported by the UE for one or more multicarrier operations. The received request may further include information related to carrier frequencies (e.g. frequency identifiers such as ARFCN, bands, etc.) for which the set of numerologies supported by the UE should be signaled by the UE to the node.

The UE may receive the request from another node via higher layer signaling (e.g. RRC, NAS signaling, etc.) or lower layer signaling (e.g. MAC, L1 message, etc.). The request can be received by the UE periodically or aperiodically (e.g. when certain a procedure such as multicarrier is being performed/configured).

Examples of other nodes are network nodes and/or another UE (e.g. capable of D2D operation). The network node can be a serving network node of the UE, core network node, etc.

Step 210

In step 210, the UE determines information related to at least one set of numerologies, referred to herein as a first set of numerologies (S1), which can be used by the UE for performing multicarrier operation involving at least two carrier frequencies: a first carrier frequency (F1) and a second carrier frequency (F2). The UE can further determine two or more sets of numerologies (e.g. S1, S2, S3, . . . , Sm) supported by the UE for performing multicarrier operation involving at least two carriers. Accordingly, the UE can further determine one or more sets of numerologies for the more than two carriers (e.g. F1, F2, F3, . . . , Fn) supported by the UE for multicarrier operation of the UE. The carriers F1, F2, ..., Fn can also be referred to as the serving carriers of the UE (e.g. PCC, SCC, PSC, etc).

The set of numerologies S comprises at least two numerologies: a first numerology (N1) used for operating a first signal in a first cell (cell1) belonging to or operating on F1, and a second numerology (N2) used for operating a second signal in a second cell (cell2) belonging to or operating on F2.

In one example, the same numerology can be used in both cells (i.e. N1=N2).

In another example, the same numerology can be used in the uplink and downlink of the same cell by the UE.

In another example, different numerologies are used in the uplink (UL) and downlink (DL) of the same cell by the UE. In this case the UE may further determine information related to a third numerology (N12) and a fourth numerology (N22) used for operating a first uplink signal (ULS1) and a second uplink signal (ULS2) used in cell1 and cell2 respectively. In one example N12 and N22 are different. In yet another example, N12 and N22 can be the same (i.e. N12=N22).

Same or different carrier frequencies can be used in the DL and UL of the same cell by the UE for performing multicarrier operation. For instance, in one example both DL and UL of cell1 can use the same carrier frequency (i.e. F1). In another example, both DL and UL of cell2 can use the same carrier frequency (i.e. F2). In another example, different carrier frequencies can be used in DL and UL of cell1 (i.e. F1_dl and F1_ul are used in DL and UL of cell1 respectively). In another example, different carrier frequencies can be used in DL and UL of cell2 (i.e. F2_dl and F2_ul are used in DL and UL of cell2 respectively). Any combination of carriers can be used for multicarrier operation.

In some embodiments, the carriers F1 and F2 can belong to the same frequency band (aka intra-band) or they can belong to different frequency bands (aka inter-band carriers). In the former case, F1 and F2 can be adjacent (intra-band contiguous carriers) or they can be non-adjacent (intra-band non-contiguous carriers).

In some embodiments, cell1 and cell2 can operate or be served by or managed by different network nodes. For example, cell1 managed by a first network node (NW1) and cell2 managed by a second network node (NW2). In another example, cell1 and cell2 may operate/served by/managed by the same network node (e.g. NW1 and NW2 are the same node).

In some embodiments, cell1 and cell2 can be serving cells such as PCell, SCell and/or PSCell. Either of cell1 or cell2 can be the PCell, PSCell or SCell. For example, the embodiments disclosed herein are applicable for any of the following non-limiting combinations of serving cells:

cell1 and cell2 are the PCell and SCell respectively;

cell1 and cell2 are the PCell and PSCell respectively;

cell1 and cell2 are the SCell and PCell respectively;

cell1 and cell2 are the PSCell and PSCell respectively;

cell1 and cell2 are the PSCell and SCell respectively;

cell1 and cell2 are the SCell and PSCell respectively.

Similarly, F1 and F2 can be any of PCC, SCC and/or PSCC and the embodiments are applicable for any combination(s) of PCC, SCC or PSCC.

In one embodiment, the numerologies used in cell1 and cell2 can be "semi-statically" configured.

In some embodiments, two or more numerologies are used, for example, multiplexed in time and/or frequency and being dynamically, semi-statically or statically configured or configured based on a pre-defiled rule or scheduling, configured, in at least one of the first and second cells.

The supported NCS (e.g. SCS) may depend on at least the UE architecture supported by the UE for multicarrier operation. The UE architecture can be characterized by its transceiver circuitry for operating signals (e.g. transmitter and/or receiver). For example, based on the UE architecture supported by the UE, the corresponding NCS information can be stored in the UE. Therefore, the UE can determine one or more set of numerologies (i.e. NCS or SCS) supported by the UE for multicarrier operation by retrieving the corresponding information stored in the UE memory. For example, if the UE has a common radio receiver and/or common radio transmitter for multicarrier operation of two or more carriers (e.g. F1, F2), then the UE may be capable of supporting the same numerology for performing multicarrier operation based on such carriers (F1 and F2). In a second example, if the UE has separate (e.g. different) radio receivers and/or separate radio transmitters for multicarrier operation of two or more carriers (e.g. F1, F2) then the UE may be capable of supporting different numerologies for performing multicarrier operation based on such carriers (F1 and F2).

The numerology combination set can be expressed by a function comprised of at least two cells and at least one numerology, which the UE can support for performing multicarrier operation. Examples of such functions are can be expressed by the following generalized expressions (1-4):

$$S1 = f(N1, N2, \text{cell1}, \text{cell2}) \quad (1)$$

$$S2 = f1(N1, N1, \text{cell1}, \text{cell2}) \quad (2)$$

$$Sk = f2(N1, N2, \ldots, Nk, \text{cell1}, \text{cell2}) \quad (3)$$

$$Sm = f3(N1, N2, \text{cell1}, \text{cell2}, \ldots, \text{Cell}m) \quad (4)$$

The rules describing NCS or subcarrier combination set (SCS) that can be supported by the UE can also be pre-defined as rules and/or requirement for the UE. For example, the UE can indicate or signal identifiers of the supported NCS or SCS to another node.

Several examples of numerology combination sets (NCS) which can be supported by the UE are shown in Tables 1 and 2. Several specific examples of NCS in terms of subcarrier combination sets (SCS), which can be supported by the UE, are shown in Tables 3, 4 and 5. These tables contain several examples of NCS or SCS. The UE may support one or plurality of such NCS (e.g. SCS) depending upon its architecture, radio circuitry, memory, processing capability, supported frequency bands etc. These examples or rules are further detailed below.

In Table 1, in each NCS the same numerology can be used by the UE in the uplink and downlink of the same cell. The UE may support one or plurality of NCS or al NCS in table 1. In one example the same UE may support only S1, while in another example the UE may support S1, S2 and S5. In set, S3, the UE can support any combination of N1 and N2 on cell1 and cell2 e.g. any of: N1 and N1, N2 and N2, or N1 and N2 on cell1 and cell2 respectively.

TABLE 1

Examples of numerology combination set (NCS) supported by the
UE for performing multicarrier operation of two or more carriers.
The same numerology is used in UL and DL of the same cell.

| Numerology combination set | Cell | Numerologies applicable for different cells |
|---|---|---|
| S1 | Cell1 | N1 |
|  | Cell2 | N2 |
| S2 | Cell1 | N1 |
|  | Cell2 | N1 |
| S3 | Cell1 | N1, N2 |
|  | Cell2 | N1, N2 |
| S4 | Cell1 | N1, N2, N3 |
|  | Cell2 | N1, N3 |
| S5 | Cell1 | N1 |
|  | Cell2 | N2 |
|  | Cell3 | N3 |
| S6 | Cell1 | N1 |
|  | Cell2 | N2 |
|  | Cell3 | N2 |
| S7 | Cell1 | N1 |
|  | Cell2 | N1 |
|  | Cell3 | N1 |
| S8 | Cell1 | N1 |
|  | Cell2 | N2 |
|  | . . . | . . . |
|  | Cellm | Nm |
| S9 | Cell1 | N1, N2, N3 |
|  | Cell2 | N2, N3, N4 |
|  | . . . | . . . |
|  | Cellm | N1, N2, N3, N4 |

In Table 2, in some NCSs different numerologies can be used by the UE in the uplink and downlink of the same cell. But in some NCSs the same numerology can be used by the UE in the uplink and downlink of the same cell. For example, if the UE supports only S10, then different numerologies can be used in the DL and UL of the same cell. But if the UE supports S13, then the same numerology can be used in the uplink and the downlink of the cell.

TABLE 2

Examples of numerology combination set supported by
the UE for performing multicarrier operation comprising
of two or more carriers. Different numerologies can
be used in UL and DL of the same cell.

| Numerology combination set | Cell | Cell Direction | Numerologies applicable for different cells |
|---|---|---|---|
| S10 | Cell1 | DL | N11 |
|  |  | UL | N12 |
|  | Cell2 | DL | N21 |
|  |  | UL | N22 |
| S11 | Cell1 | DL | N11, N21, N31 |
|  |  | UL | N12, N22, N32 |
|  | Cell2 | DL | N11, N21 |
|  |  | UL | N12, N22 |
| S12 | Cell1 | DL | N1 |
|  |  | UL | N2 |
|  | Cell2 | DL | N1 |
|  |  | UL | N2 |
| S13 | Cell1 | DL | N1 |
|  |  | UL | N1 |
|  | Cell2 | DL | N1 |
|  |  | UL | N1 |
| S14 | Cell1 | DL | N11 |
|  |  | UL | N12 |
|  | Cell2 | DL | N21 |
|  |  | UL | N22 |
|  | Cell3 | DL | N31 |
|  |  | UL | N32 |

TABLE 2-continued

Examples of numerology combination set supported by
the UE for performing multicarrier operation comprising
of two or more carriers. Different numerologies can
be used in UL and DL of the same cell.

| Numerology combination set | Cell | Cell Direction | Numerologies applicable for different cells |
|---|---|---|---|
| S15 | Cell1 | DL | N11 |
|  |  | UL | N12 |
|  | Cell2 | DL | N21 |
|  |  | UL | N22 |
|  | . . . | . . . | . . . |
|  | Cellm | DL | Nm1 |
|  |  | UL | Nm2 |

In Table 3, the NCSs are expressed in terms of SCS examples. The UE can support any one or more of the SCS. In each SCS the same subcarrier spacing can be used in the UL and DL of the same cell.

TABLE 3

Specific examples of numerology combination set in terms of
subcarrier combination set supported by the UE for performing
multicarrier operation of two or more carriers. Same subcarrier
spacing (Sp) is used in UL and DL of the same cell.

| Subcarrier combination set | Cell | Subcarrier spacings applicable for different cells |
|---|---|---|
| C1 | Cell1 | 15 KHz |
|  | Cell2 | 30 KHz |
| C2 | Cell1 | 15 KHz |
|  | Cell2 | 15 KHz |
| C3 | Cell1 | 60 KHz |
|  | Cell2 | 60 KHz |
| C4 | Cell1 | 15 KHz, 30 KHz |
|  | Cell2 | 15 KHz, 30 KHz |
| C5 | Cell1 | 15 KHz, 30 KHz |
|  | Cell2 | 15 KHz |
| C6 | Cell1 | 15 KHz, 30 KHz |
|  | Cell2 | 15 KHz, 30 KHz, 60 KHz |
| C7 | Cell1 | 15 KHz |
|  | Cell2 | 30 KHz |
|  | Cell3 | 120 KHz |
| C8 | Cell1 | 30 KHz |
|  | Cell2 | 30 KHz |
|  | Cell3 | 30 KHz |
| C9 | Cell1 | 15 KHz, 30 KHz |
|  | Cell2 | 30 KHz |
|  | . . . | . . . |
|  | Cellm | 30 KHz, 60 KHz, 120 KHz |

The examples in Table 4 illustrate SCSs similar to those in Table 3, except that the SCSs in Table 4 includes the range of subcarrier spacings (Sp) supported on each cell used for multicarrier operation. For example, a UE capable of C11 can support any subcarrier spacing between 15 KHz to 60 KHz on cell and any subcarrier spacing between 15 KHz to 120 KHz on cell2. If pre-defined subcarrier spacings (Sp) are 15, 30, 60 and 120 KHz, then the UE capable of C11 can support any Sp of 15, 30 and 60 KHz on cell and any Sp of 15, 30, 60 and 120 KHz on cell2 for multicarrier operation involving cell1 and cell2.

TABLE 4

Specific examples of numerology combination set in terms of subcarrier combination set supported by the UE for performing multicarrier operation of two or more carriers. Same subcarrier spacing (Sp) is used in UL and DL of the same cell. In some cases, Sp can be any value between the specified ranges.

| Subcarrier combination set | Cell | Subcarrier spacings applicable for different cells |
|---|---|---|
| C10 | Cell1 | 15 KHz |
|  | Cell2 | Sp ≤ 30 KHz |
| C11 | Cell1 | 15 KHz ≤ Sp ≤ 60 KHz |
|  | Cell2 | 15 KHz ≤ Sp ≤ 120 KHz |
| C12 | Cell1 | ≤60 KHz |
|  | Cell2 | ≤60 KHz |
| C13 | Cell1 | 15 KHz ≤ Sp ≤ 60 KHz |
|  | Cell2 | 15 KHz ≤ Sp ≤ 60 KHz |
| C14 | Cell1 | 15 KHz |
|  | Cell2 | Sp ≤ 30 KHz |
|  | Cell3 | 30 KHz ≤ Sp ≤ 120 KHz |
| C15 | Cell1 | 15 KHz ≤ Sp ≤ 60 KHz |
|  | Cell2 | 30 KHz |
|  | ... | ... |
|  | Cellm | 60 KHz ≤ Sp ≤ 240 KHz |

The examples in Table 5 illustrate SCSs where different subcarrier spacings (Sp) can be supported in the UL and DL of some cells supported by the UE for the multicarrier operation.

TABLE 5

Specific examples of numerology combination set in terms of subcarrier combination set supported by the UE for performing multicarrier operation of two or more carriers. Different subcarrier spacing (Sp) can be used in UL and DL of the same cell. In some cases, Sp can be any value between the specified ranges.

| Subcarrier combination set | Cell | Cell direction | Subcarrier spacings applicable for different cells |
|---|---|---|---|
| C16 | Cell1 | DL | 15 KHz |
|  |  | UL | 30 KHz |
|  | Cell2 | DL | 15 KHz |
|  |  | UL | 30 KHz |
| C17 | Cell1 | DL | 30 KHz |
|  |  | UL | 30 KHz |
|  | Cell2 | DL | 30 KHz |
|  |  | UL | 30 KHz |
| C18 | Cell1 | DL | 15 KHz, 30 KHz |
|  |  | UL | 30 KHz |
|  | Cell2 | DL | 15 KHz, 30 KHz, 60 KHz |
|  |  | UL | 30 KHz, 60 KHz |
| C19 | Cell1 | DL | 15 KHz, 30 KHz |
|  |  | UL | ≤30 KHz |
|  | Cell2 | DL | 30 KHz ≤ Sp ≤ 120 KHz |
|  |  | UL | 30 KHz, 60 KHz |
| C20 | Cell1 | DL | 15 KHz ≤ Sp ≤ 60 KHz |
|  |  | UL | 15 KHz ≤ Sp ≤ 120 KHz |
|  | Cell2 | DL | 15 KHz ≤ Sp ≤ 30 KHz |
|  |  | UL | 15 KHz ≤ Sp ≤ 60 KHz |
| C21 | Cell1 | DL | 15 KHz ≤ Sp ≤ 60 KHz |
|  |  | UL | ≤60 KHz |
|  | ... | ... | ... |
|  | Cellm | DL | 60 KHz ≤ Sp ≤ 480 KHz |
|  |  | UL | 15 KHz, 30 KHz |

In some embodiments, the numerologies supported within a particular NCS can further depend on the relation between carriers involved in the multicarrier operation. Such NCS can be expressed in terms of rules which can also be pre-defined. Some non-limiting examples of relations between carriers include:

carriers belonging to the same band;
carriers belonging to the same band and they are adjacent;
carriers belonging to the same band and they are non-adjacent;
difference in frequencies of the non-adjacent carriers in the same band;
carriers belonging to different frequency bands;
any combination of the above, e.g. F1 and F2 are adjacent and belong to the same band (B1) while F3 belongs to another band (B2).

Some non-limiting examples of rules for determining NCS which depend on the relation between carriers include:
same numerology is used on all carriers if they belong to the same band;
same numerology is used on all carriers if they belong to the same band and are also adjacent;
either same numerology or different numerologies can be used on carriers if they belong to different bands;
same numerology can be used on carriers if they belong to different bands but the frequencies of the carriers are within certain frequency range (e.g. within 200 MHz);
different numerologies can be used on carriers if they belong to different bands but the difference between frequencies of the carriers is larger than certain threshold (e.g. more than 200 MHz);
if the carriers are non-adjacent but they belong to the same band, then whether the same numerology or different numerologies can be used on carriers can depend on the frequency gap between carriers (or between frequency blocks). For example, the same numerology can be used provided that the length of the frequency gap is not larger than certain threshold.

Step 220

In step 220, the UE can perform one or more radio operational tasks based on at least one set of numerology combination set (NCS) determined in the previous step (e.g. S1, C1 etc.).

In some embodiments, the operational task(s) can include reporting or transmitting the results or information of the determined numerology combination set to another node. Examples of another node are another UE capable of D2D operation, a network node such as a serving network node, a core network node, etc. The UE can signal or transmit the information with or without receiving a request from another node. The information may be transmitted in terms of or as part of UE capability information (e.g. UE radio access capability). The information may include any one or more of: values of numerologies within the NCS, identifier(s) of pre-defined NCS determined by the UE, information about carrier frequencies (e.g. EARFCN, ARFCN, etc.) and/or frequency bands (e.g. band identifier) associated with the determined NCS, etc.

In some embodiments, the operational task(s) can include using results or information associated with the determined numerology combination set for multicarrier operation (e.g. using the numerologies within NCS for transmitting and/or receiving signals on carriers configured for multicarrier operation).

In some embodiments, the operational task(s) can include adapting transceiver configuration for transmitting and/or receiving signals on carriers configured for multicarrier operation, etc.

Step 230

In some embodiments this step is optional for the UE. In step 230, the UE can receive a request from a network node to perform multicarrier operation involving at least F1 and F2 based on at least one determined NCS (e.g. S1). The UE can receive the request after transmitting information about the determined NCS to the network node. The request can further indicate the type of serving cells to operate on F1 and F2 (e.g. PCell and SCell on F1 and F2 respectively). The request can further indicate the specific numerologies to be used by the UE for operating signals on F1 and F2 (e.g. subcarrier spacings of 15 KHz and 30 KHz on F1 and F2 respectively).

The UE, upon receiving the request, can configure its transceiver and start the multicarrier operation (e.g. CA) on F1 and F2 using the indicated numerologies for the respective carriers/serving cells.

Figure 6:
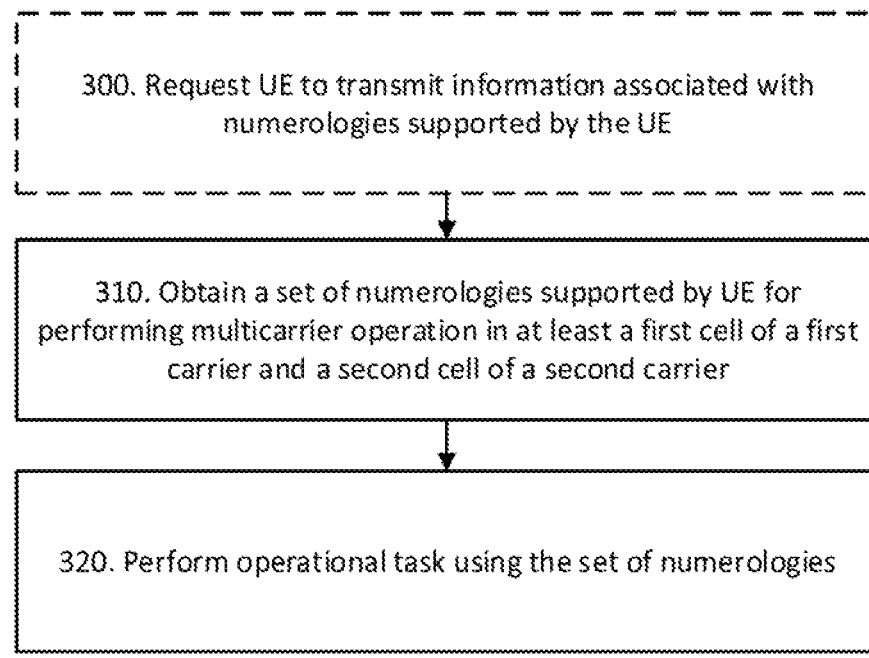
FIG. 6 is a flow chart illustrating a method which can be performed in a network node.

FIG. 6 is a flow chart illustrating a method which can be performed in a network node, such as radio access node 120. The network node can be any of the first network node (NW1), second network node (NW2), or another radio network node (e.g. neighbor of NW1 and/or NW2), core network node, etc. as have been described herein. The method can include:

Step 300 (optional): Requesting a UE to transmit information about a set of numerologies supported by the UE for multicarrier operation.

Step 310: Obtaining at least a first set of numerologies (S1) including at least two numerologies: a first numerology (N1) and a second numerology (N2), used by a UE for operating signals in a first cell (cell1) of a first carrier (F1) and a second cell (cell2) of a second carrier (F2), respectively, for performing multicarrier operation of the UE.

Step 320: Using the obtained set of numerologies (S1) for performing one or more operational tasks, for example, configuring the UE for multicarrier operation based on S1, transmitting the obtained information S1 to another node, using S1 for multicarrier operation involving the UE, adapting transceiver configuration, adapting scheduling, etc.

It will be appreciated that one or more of the above steps can be performed simultaneously and/or in a different order. Also, steps illustrated in dashed lines are optional and can be omitted in some embodiments. The steps will now be described in more detail.

Step 300

In some embodiments this step is optional for the network node. In step 300, the network node can transmit a request for a UE to transmit information about the UE's capability related to at least one numerology combination set (NCS) supported by the UE for performing multicarrier operation. The request can further include the information about the carrier frequencies associated with one or more NCS supported by the UE. This can be similar to as described for the UE in FIG. 5 step 200.

Step 310

In step 310, the network node can obtain information related to at least one set of numerologies (e.g. S1), which can be used by the UE for performing multicarrier operation involving at least two carrier frequencies: a first carrier frequency (F1) and a second carrier frequency (F2).

The embodiments related to determining the NCS and/or SCS and information related to the NCS and/or SCS as described for the UE in FIG. 5 step 210 can also be applicable to the network node embodiments described herein.

The network node can obtain at least one set of numerologies (NCS) based on any one or more of the following mechanisms:

Pre-defined information or rules as described above for the UE embodiments (e.g. pre-defined mapping tables such as Tables 1-5).

Information received from another node, e.g. from the UE or from another network node.

History or statistics, e.g. values used in the past, values used most frequently in certain time period(s) in the past.

Recently used values, e.g. recent values stored in the memory of the network node.

Step 320

In step 320, the network node uses the obtained NCS set (e.g. S1) for performing one or more operational tasks or procedures.

In some embodiments, operational tasks can include configuring the UE with multicarrier operation based on the determined NCS which is supported by the UE as well as by the network node (e.g. S1). For example, assume that the network node determines that the UE supports SCS C1 and C3 as described in Table 3, but the network node supports only C3. In this case, the UE is configured with only C3.

In some embodiments, operational tasks can include transmitting the obtained information to another node, e.g. another network node.

In some embodiments, operational tasks can include using S1 for multicarrier operation involving the UE, e.g. transmitting and/or receiving signals on cell1 and cell using the associated numerologies.

In some embodiments, operational tasks can include adapting transceiver configuration for transmitting and/or receiving signals to the UE.

In some embodiments, operational tasks can include adaptation of scheduling of data in the UL and/or DL on the serving cells of the UE based on the determined numerologies.

In some embodiments, operational tasks can include adapting measurement configuration or measurement performance of measurement(s) performed by the UE on serving cells of the UE based on the obtained NCS. For example, configuring the UE to perform measurement(s) over certain measurement time(s), which is adapted to the configured numerology or NCS on at least two serving cells.

In some embodiments, operational tasks can include adapting or changing the numerology of cell1 and/or cell2 if the UE supports more than one numerology for the same cell during multicarrier operation.

Figure 7:
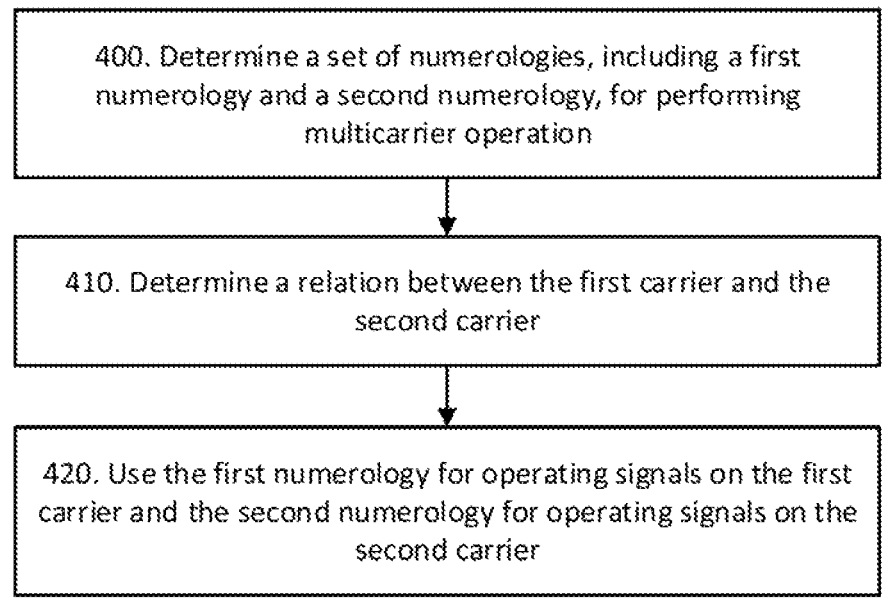
FIG. 7 is a flow chart illustrating a method for determining a set of numerologies for performing multicarrier operation.

FIG. 7 is a flow chart illustrating a method for determining a set of numerologies for performing multicarrier operation. The method can be performed by a wireless device, such as UE 110, as described herein. The method can include:

Step 400: Determining a set of numerologies supported by the wireless device for performing multicarrier operation. The set of numerologies includes at least a first numerology for operating signals on a first carrier in a first cell and a second numerology for operating signals on a second carrier in a second cell.

The numerologies can include attribute(s) defining signal characteristics, such as: subcarrier spacing, a symbol duration, a cycle prefix length, a time slot duration, a frame duration, a subframe duration, a transmission time interval duration, a number of subcarriers per physical channel, and/or a number of physical channels within the bandwidth.

Step 410: Determining a relation between the first carrier and the second carrier.

In some embodiments, the numerologies to be used by the wireless device for multicarrier operation can depend on the relation between the first and second carrier frequencies. Examples of the relation between the first and second carrier can include: the first and second carriers belong to the same frequency band; the first and second carriers belong to different frequency bands; the difference between frequencies of the first and second carriers being greater than or less than a given threshold; the first and second carriers being adjacent; the first and second carriers being non-adjacent; and/or any combination of these relations.

Step 420: Responsive to determining the relation between the first carrier and the second carrier, using the first numerology for operating the signals on the first carrier in the first cell and the second numerology for operating the signals on the second carrier in the second cell.

In some embodiments, the numerologies to be used by the wireless device for multicarrier operation are selected in accordance with the determined relation between the first and second carriers. For example, different numerologies can be used for the first numerology and the second numerology in accordance with determining that the first and second carriers belong to different frequency bands. In another example, the same numerology can be used for the first numerology and the second numerology in accordance with determining that the first and second carriers belong to the same frequency band. In some embodiments, the first and second numerologies can further depend on determining a difference between the frequencies of the first and second carriers (e.g. greater than or less than a threshold, within a certain range of each other, adjacent or non-adjacent frequencies, etc.).

In some embodiments, the wireless device can use the same, or different, numerologies for operating signals on the downlink channel and the uplink channel of the first carrier. Similarly, in some embodiments, the wireless device can use the same, or different, numerologies for operating signals on the downlink channel and the uplink channel of the second carrier.

In some embodiments, the wireless device can use a common transmitter and/or a common receiver when using a same numerology for the first numerology and the second numerology. In some embodiments, the wireless device can use different transmitters and/or different receivers when using a different numerology for the first numerology and the second numerology.

In some embodiments, the method of FIG. 7 can further include receiving a request to perform multicarrier operation from a network node. In some embodiments, the method of FIG. 7 can further include transmitting information associated with the set of numerologies supported by the wireless device for performing multicarrier operation to a network node.

It will be appreciated that one or more of the above steps can be performed simultaneously and/or in a different order. Also, steps illustrated in dashed lines are optional and can be omitted in some embodiments.

Figure 8:
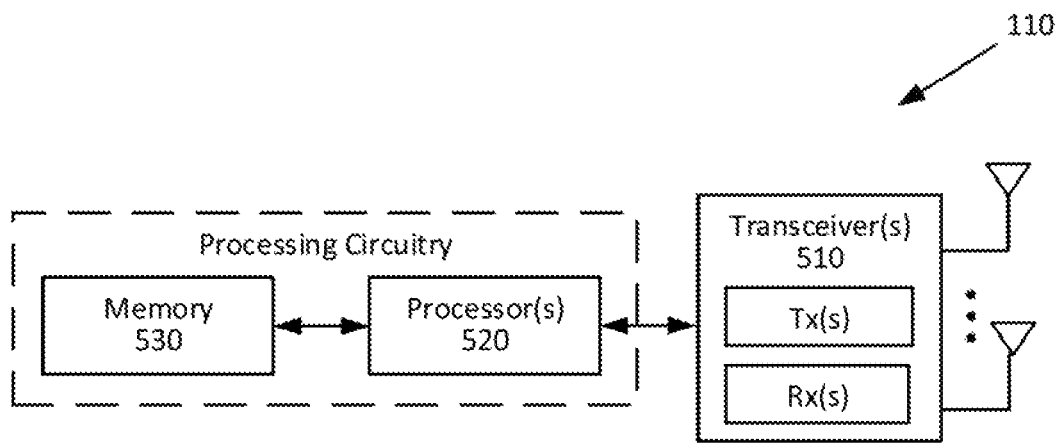
FIG. 8 is a block diagram of an example wireless device.

FIG. 8 is a block diagram of an example wireless device, UE 110, in accordance with certain embodiments. UE 110 includes a transceiver 510, processor 520, and memory 530. In some embodiments, the transceiver 510 facilitates transmitting wireless signals to and receiving wireless signals from radio access node 120 (e.g., via transmitter(s) (Tx), receiver(s) (Rx) and antenna(s)). The processor 520 executes instructions to provide some or all of the functionalities described above as being provided by UE, and the memory 530 stores the instructions executed by the processor 520. In some embodiments, the processor 520 and the memory 530 form processing circuitry.

The processor 520 can include any suitable combination of hardware to execute instructions and manipulate data to perform some or all of the described functions of a wireless device, such as the functions of UE 110 described above. In some embodiments, the processor 520 may include, for example, one or more computers, one or more central processing units (CPUs), one or more microprocessors, one or more application specific integrated circuits (ASICs), one or more field programmable gate arrays (FPGAs) and/or other logic.

The memory 530 is generally operable to store instructions, such as a computer program, software, an application including one or more of logic, rules, algorithms, code, tables, etc. and/or other instructions capable of being executed by a processor 520. Examples of memory 530 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information, data, and/or instructions that may be used by the processor 520 of UE 110.

Other embodiments of UE 110 may include additional components beyond those shown in FIG. 8 that may be responsible for providing certain aspects of the wireless device's functionalities, including any of the functionalities described above and/or any additional functionalities (including any functionality necessary to support the solution described above). As just one example, UE 110 may include input devices and circuits, output devices, and one or more synchronization units or circuits, which may be part of the processor 520. Input devices include mechanisms for entry of data into UE 110. For example, input devices may include input mechanisms, such as a microphone, input elements, a display, etc. Output devices may include mechanisms for outputting data in audio, video and/or hard copy format. For example, output devices may include a speaker, a display, etc.

Figure 9:
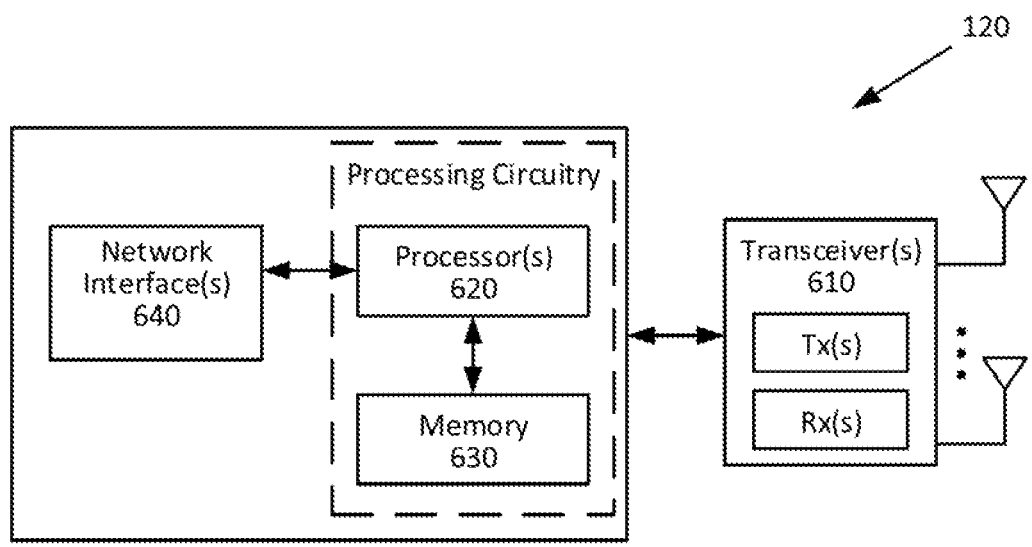
FIG. 9 is a block diagram of an example network node.

FIG. 9 is a block diagram of an exemplary network node 120, in accordance with certain embodiments. Network node 120 may include one or more of a transceiver 610, processor 620, memory 630, and network interface 640. In some embodiments, the transceiver 610 facilitates transmitting wireless signals to and receiving wireless signals from wireless devices, such as UE 110 (e.g., via transmitter(s) (Tx), receiver(s) (Rx), and antenna(s)). The processor 620 executes instructions to provide some or all of the functionalities described above as being provided by a network node 120, the memory 630 stores the instructions executed by the processor 620. In some embodiments, the processor 620 and the memory 630 form processing circuitry. The network interface 640 can communicate signals to backend network components, such as a gateway, switch, router, Internet, Public Switched Telephone Network (PSTN), core network nodes or radio network controllers, etc.

The processor 620 can include any suitable combination of hardware to execute instructions and manipulate data to perform some or all of the described functions of network node 120, such as those described above. In some embodiments, the processor 620 may include, for example, one or more computers, one or more central processing units (CPUs), one or more microprocessors, one or more application specific integrated circuits (ASICs), one or more field programmable gate arrays (FPGAs) and/or other logic.

The memory 630 is generally operable to store instructions, such as a computer program, software, an application including one or more of logic, rules, algorithms, code, tables, etc. and/or other instructions capable of being executed by a processor 620. Examples of memory 630 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, the network interface 640 is communicatively coupled to the processor 620 and may refer to any suitable device operable to receive input for network node 120, send output from network node 120, perform suitable processing of the input or output or both, communicate to other devices, or any combination of the preceding. The network interface 640 may include appropriate hardware (e.g., port, modem, network interface card, etc.) and software, including protocol conversion and data processing capabilities, to communicate through a network.

Other embodiments of network node 120 can include additional components beyond those shown in FIG. 9 that may be responsible for providing certain aspects of the network node's functionalities, including any of the functionalities described above and/or any additional functionalities (including any functionality necessary to support the solutions described above). The various different types of network nodes may include components having the same physical hardware but configured (e.g., via programming) to support different radio access technologies, or may represent partly or entirely different physical components.

Processors, interfaces, and memory similar to those described with respect to FIGS. 8 and 9 may be included in other network nodes (such as core network node 130). Other network nodes may optionally include or not include a wireless interface (such as the transceiver described in FIGS. 8 and 9).

Figure 10:
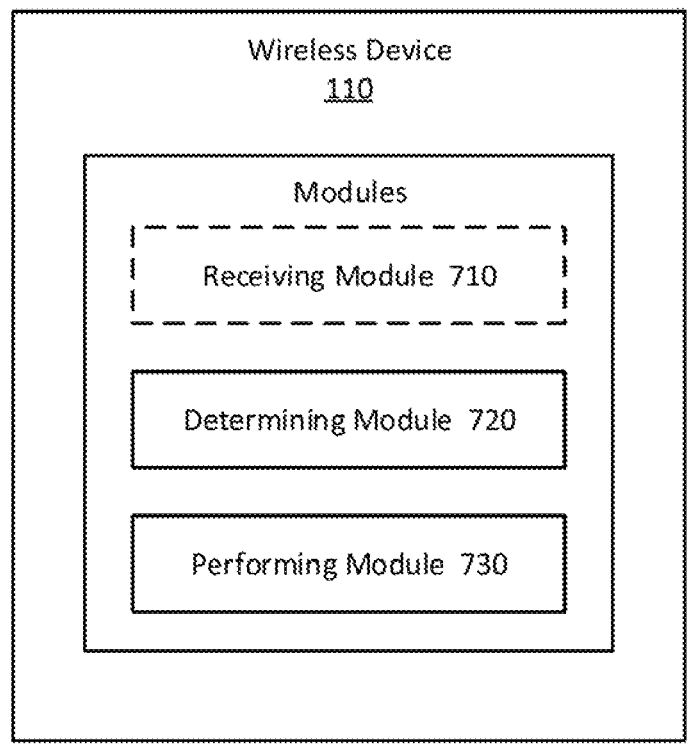
FIG. 10 is a block diagram of an example wireless device with modules.

In some embodiments, the wireless device, such as UE 110, can comprise a series of modules configured to implement the functionalities of the wireless device described above. Referring to FIG. 10, in some embodiments, UE 110 can comprise a receiving module 710 configured to receive a request to transmit information associated with numerologies supported by the UE for multicarrier operation, a determining module configured to determine a set of numerologies for performing multicarrier operation in at least a first cell of a first carrier and a second cell of a second carrier, and a performing module configured to perform an operational task using the determined set of numerologies.

It will be appreciated that the various modules may be implemented as combination of hardware and software, for instance, the processor, memory and transceiver(s) of UE 110 shown in FIG. 8. Some embodiments may also include additional modules to support additional and/or optional functionalities.

In some embodiments, the network node 120, which can be, for example, a radio access node, may comprise a series of modules configured to implement the functionalities of the network node described above. Referring to FIG. 1, in some embodiments, the network node 120 can comprise a requesting module 740 configured to request a wireless device to transmit information associated with numerologies supported by the wireless device, an obtaining module 750 configured to obtain a set of numerologies supported by the wireless device for performing multicarrier operation in at least a first cell of a first carrier and a second cell of a second carrier, and a performing module 760 configured to perform an operational task using the obtained set of numerologies.

It will be appreciated that the various modules may be implemented as combination of hardware and software, for instance, the processor, memory and transceiver(s) of network node 120 shown in FIG. 9. Some embodiments may also include additional modules to support additional and/or optional functionalities.

Some embodiments may be represented as a software product stored in a machine-readable medium (also referred to as a computer-readable medium, a processor-readable medium, or a computer usable medium having a computer readable program code embodied therein). The machine-readable medium may be any suitable tangible medium including a magnetic, optical, or electrical storage medium including a diskette, compact disk read only memory (CD-ROM), digital versatile disc read only memory (DVD-ROM) memory device (volatile or non-volatile), or similar storage mechanism. The machine-readable medium may contain various sets of instructions, code sequences, configuration information, or other data, which, when executed, cause processing circuitry (e.g. a processor) to perform steps in a method according to one or more embodiments. Those of ordinary skill in the art will appreciate that other instructions and operations necessary to implement the described embodiments may also be stored on the machine-readable medium. Software running from the machine-readable medium may interface with circuitry to perform the described tasks.

The above-described embodiments are intended to be examples only. Alterations, modifications and variations may be effected to the particular embodiments by those of skill in the art without departing from the scope of the description.

Glossary

The present description may comprise one or more of the following abbreviation:

3GPP Third Generation Partnership Project
ABS Almost Blank Subframe
AP Access point
ARQ Automatic Repeat Request
BCH Broadcast Channel
BS Base Station
BSC Base station controller
BTS Base transceiver station
CA Carrier Aggregation
CC Component carrier
CCCH SDU Common Control Channel SDU
CG Cell group
CGI Cell Global Identifier
CP Cyclic Prefix
CPICH Ec/No CPICH Received energy per chip divided by the power density in the
CPICH Common Pilot Channel
CQI Channel Quality information
C-RNTI Cell RNTI
CRS Cell-specific Reference Signal
CSG Closed subscriber group
CSI Channel State information
DAS Distributed antenna system
DC Dual connectivity
DCCH Dedicated Control Channel
DCI Downlink Control Information
DL Downlink
DL-SCH Downlink shared channel
DRX Discontinuous Reception
DTCH Dedicated Traffic Channel
DTX Discontinuous Transmission
EARFCN Evolved absolute radio frequency channel number ECCE Enhanced Control Channel Element
ECGI Evolved CGI
E-CID Enhanced Cell-ID (positioning method)
eNB E-UTRAN NodeB or evolved NodeB
ePDCCH enhanced Physical Downlink Control Channel
E-SMLC evolved Serving Mobile Location Center
E-UTRA Evolved UTRA
E-UTRAN Evolved UTRAN
FDM Frequency Division Multiplexing
GERAN GSM EDGE Radio Access Network
GSM Global System for Mobile communication
HARQ Hybrid Automatic Repeat Request
HO Handover
HRPD High Rate Packet Data
HSPA High Speed Packet Access
LTE Long-Term Evolution
M2M Machine to Machine
LMAC Medium Access Control
MBMS Multimedia Broadcast Multicast Services
MCG Master cell group
MDT Minimization of Drive Tests
MeNB Master eNode B
MME Mobility Management Entity
MPDCCH MTC Physical Downlink Control Channel
MSC Mobile Switching Center
MSR Multi-standard Radio
MTC Machine Type Communication
NPBCH Narrowband Physical Broadcast Channel
NPDCCH Narrowband Physical Downlink Control Channel
NR New Radio
O&M Operation and Maintenance
OFDM Orthogonal Frequency Division Multiplexing
OFDMA Orthogonal Frequency Division Multiple Access
OSS Operations Support System
PBCH Physical Broadcast Channel
PCC Primary Component Carrier
P-CCPCH Primary Common Control Physical Channel
PCell Primary Cell
PCFICH Physical Control Format Indicator Channel
PCG Primary Cell Group
PCH Paging Channel
PCI Physical Cell Identity
PDCCH Physical Downlink Control Channel
PDSCH Physical Downlink Shared Channel
PDU Protocol Data Unit
PGW Packet Gateway
PHICH Physical HARQ indication channel
PLMN Public Land Mobile Network
PMI Precoder Matrix Indicator
PRACH Physical Random Access Channel
ProSe Proximity Service
PRS Positioning Reference Signal
PSC Primary serving cell
PSCell Primary SCell
PSS Primary Synchronization Signal
PSSS Primary Sidelink Synchronization Signal
PUCCH Physical Uplink Control Channel
PUSCH Physical Uplink Shared Channel
QAM Quadrature Amplitude Modulation
RACH Random Access Channel
RAT Radio Access Technology
RB Resource Block
RF Radio Frequency
RLM Radio Link Management
RNC Radio Network Controller
RNTI Radio Network Temporary Identifier
RRC Radio Resource Control
RRH Remote Radio Head
RRM Radio Resource Management
RRU Remote Radio Unit
RSCP Received Signal Code Power
RSRP Reference Signal Received Power
RSRQ Reference Signal Received Quality
RSSI Received Signal Strength Indicator
RSTD Reference Signal Time Difference
SCC Secondary Component Carrier
SCell Secondary Cell
SCG Secondary Cell Group
SCH Synchronization Channel
SDU Service Data Unit
SeNB Secondary eNodeB
SFN System Frame Number
SGW Serving Gateway
St System Information
SIB System Information Block
SINR Signal to Interference and Noise Ratio
SNR Signal Noise Ratio
SON Self-organizing Network
SRS Sounding Reference Signal
SSC Secondary Serving Cell
SSS Secondary synchronization signal
SSSS Secondary Sidelink Synchronization Signal
TA Timing Advance
TAG Timing Advance Group
TTI Transmission Time Interval
Tx Transmitter
UE User Equipment
UL Uplink
UMTS Universal Mobile Telecommunication System
UTRA Universal Terrestrial Radio Access
UTRAN Universal Terrestrial Radio Access Network
WLAN Wireless Local Area Network

The invention claimed is:

1. A method performed by a wireless device, the wireless device configured to support a set of numerologies for performing multicarrier operation, the set of numerologies including at least a first numerology for operating signals on a first carrier in a first cell and a second numerology for operating signals on a second carrier in a second cell, the method comprising:
responsive to determining that the first and second carriers belong to different frequency bands, using the first numerology for operating the signals on the first carrier in the first cell and the second numerology for operating the signals on the second carrier in the second cell, wherein the first numerology and the second numerology are different numerologies.

2. The method of claim 1, wherein the first and second numerologies comprise one or more attributes defining signal characteristics.

3. The method of claim 2, wherein the one or more attributes include at least one of a subcarrier spacing, a symbol duration, a cycle prefix length, a time slot duration, a frame duration, a subframe duration, a transmission time interval duration, a number of subcarriers per physical channel, and a number of physical channels within the bandwidth.

4. The method of claim 1, further comprising, determining that a difference between frequencies of the first and second carriers is greater than a threshold.

5. The method of claim 1, further comprising, using at least one of a different transmitter and a different receiver when using the different numerologies for the first numerology and the second numerology.

6. The method of claim 1, further comprising, using different numerologies for operating signals on a downlink channel and an uplink channel of the first carrier.

7. A wireless device comprising circuitry including a processor and a memory, the wireless device configured to support a set of numerologies for performing multicarrier operation, the set of numerologies including at least a first numerology for operating signals on a first carrier in a first cell and a second numerology for operating signals on a second carrier in a second cell, the memory containing instructions executable by the processor whereby the wireless device is operative to:
responsive to determining that the first and second carriers belong to different frequency bands, use the first numerology for operating the signals on the first carrier in the first cell and the second numerology for operating the signals on the second carrier in the second cell, wherein the first numerology and the second numerology are different numerologies.

8. The wireless device of claim 7, wherein the first and second numerologies comprise one or more attributes defining signal characteristics.

9. The wireless device of claim 8, wherein the one or more attributes include at least one of a subcarrier spacing, a symbol duration, a cycle prefix length, a time slot duration, a frame duration, a subframe duration, a transmission time interval duration, a number of subcarriers per physical channel, and a number of physical channels within the bandwidth.

10. The wireless device of claim 7, further comprising, determining that a difference between frequencies of the first and second carriers is greater than a threshold.

11. The wireless device of claim 7, further comprising, using at least one of a different transmitter and a different receiver when using the different numerologies for the first numerology and the second numerology.

12. The wireless device of claim 7, further comprising, using different numerologies for operating signals on a downlink channel and an uplink channel of the first carrier.

13. A method performed by a wireless device, the wireless device configured to support a set of numerologies for performing multicarrier operation, the set of numerologies including at least a first numerology for operating signals on a first carrier in a first cell and a second numerology for operating signals on a second carrier in a second cell, the method comprising:
determining a difference between frequencies of the first and second carriers;
responsive to determining that the difference between frequencies of the first and second carriers is greater than a threshold, using the first numerology for operating the signals on the first carrier in the first cell and the second numerology for operating the signals on the second carrier in the second cell, wherein the first numerology and the second numerology are different numerologies; and
responsive to determining that the difference between frequencies of the first and second carriers is less than or equal to the threshold, using the first numerology for operating the signals on the first carrier in the first cell and the second numerology for operating the signals on the second carrier in the second cell, wherein the first numerology and the second numerology are a same numerology.

14. The method of claim 13, wherein the first and second numerologies comprise one or more attributes defining signal characteristics.

15. The method of claim 14, wherein the one or more attributes include at least one of a subcarrier spacing, a symbol duration, a cycle prefix length, a time slot duration, a frame duration, a subframe duration, a transmission time interval duration, a number of subcarriers per physical channel, and a number of physical channels within the bandwidth.

16. The method of claim 13, further comprising, determining that the first and second carriers belong to different frequency bands.

17. The method of claim 13, further comprising, determining that the first and second carriers belong to a same frequency band.

18. The method of claim 13, further comprising, determining that frequencies of the first and second carriers are non-adjacent.

19. The method of claim 13, further comprising, using at least one of a common transmitter and a common receiver when using the same numerology for the first numerology and the second numerology.

20. The method of claim 13, further comprising, using at least one of a different transmitter and a different receiver when using the different numerologies for the first numerology and the second numerology.

* * * * *

UNITED STATES PATENT AND TRADEMARK OFFICE
CERTIFICATE OF CORRECTION

PATENT NO. : 10,938,609 B2
APPLICATION NO. : 16/475468
DATED : March 2, 2021
INVENTOR(S) : Kazmi et al.

It is certified that error appears in the above-identified patent and that said Letters Patent is hereby corrected as shown below:

In the Specification

In Column 7, Line 32, delete "1108," and insert -- 110B, --, therefor.

In Column 7, Line 35, delete "network 100" and insert -- wireless network 100 --, therefor.

In Column 7, Line 42, delete "UE 10A" and insert -- UE 110A --, therefor.

In Column 7, Line 47, delete "coverage 115" and insert -- coverage area 115 --, therefor.

In Column 10, Line 32, delete "are can" and insert -- can --, therefor.

In Column 12, Line 62, delete "cell" and insert -- cell1 --, therefor.

In Column 12, Line 65, delete "cell" and insert -- cell1 --, therefor.

In Column 16, Line 22, delete "cell" and insert -- cell1 --, therefor.

In Column 18, Line 15, delete "and/or or" and insert -- and/or --, therefor.

In Column 19, Line 4, delete "and/or or" and insert -- and/or --, therefor.

Figure 11:
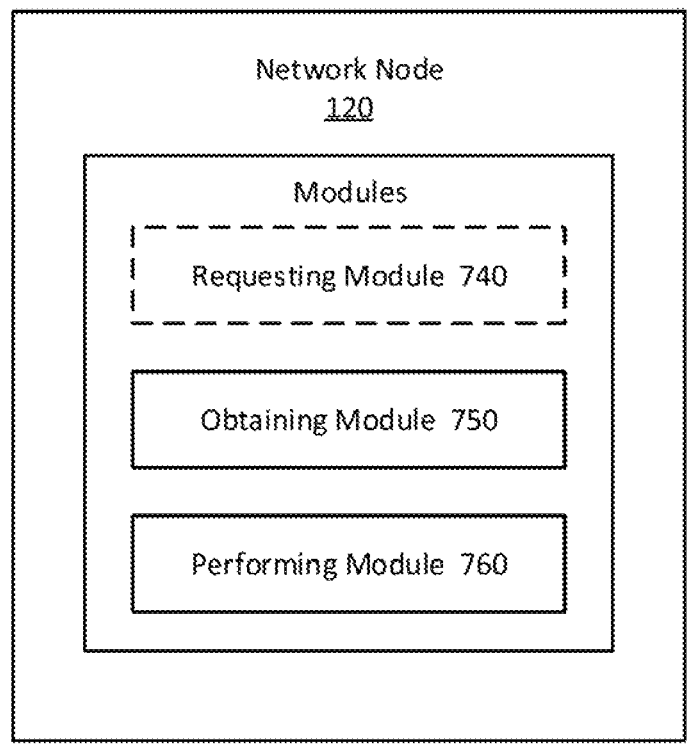
FIG. 11 is a block diagram of an example network node with modules.

In Column 19, Line 55, delete "FIG. 1," and insert -- FIG. 11, --, therefor.

Signed and Sealed this
Seventeenth Day of May, 2022

Katherine Kelly Vidal
*Director of the United States Patent and Trademark Office*